United States Patent
Tian et al.

(10) Patent No.: US 11,330,403 B2
(45) Date of Patent: May 10, 2022

(54) SYSTEM AND METHOD FOR CROWD-ORIENTED APPLICATION SYNCHRONIZATION

(71) Applicant: MOTOROLA SOLUTIONS, INC., Chicago, IL (US)

(72) Inventors: Yong Tian, Sichuan (CN); Haiqing Hu, Sichuan (CN); Dong Zhao, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/771,822

(22) PCT Filed: Dec. 22, 2017

(86) PCT No.: PCT/CN2017/118079
§ 371 (c)(1),
(2) Date: Jun. 11, 2020

(87) PCT Pub. No.: WO2019/119440
PCT Pub. Date: Jun. 27, 2019

(65) Prior Publication Data
US 2021/0144518 A1 May 13, 2021

(51) Int. Cl.
*H04W 4/10* (2009.01)
*G06F 9/52* (2006.01)
(Continued)

(52) U.S. Cl.
CPC ........... *H04W 4/10* (2013.01); *G06F 9/52* (2013.01); *H04W 4/08* (2013.01); *H04W 84/18* (2013.01)

(58) Field of Classification Search
CPC ......... H04W 4/10; H04W 4/08; H04W 84/18; G06F 9/52
(Continued)

(56) References Cited

U.S. PATENT DOCUMENTS 7,110,976 B2 *  9/2006  Heimermann ..... G06Q 10/0631
                                                       705/37
7,620,689 B2 * 11/2009  LoBuono ................ H04L 51/04
                                                       709/204
(Continued)

FOREIGN PATENT DOCUMENTS

CN    103338256 A    10/2013
CN    105847020 A     8/2016
WO    2016/204483 A1 12/2016

OTHER PUBLICATIONS

International Search Report and Written Opinion for related International Application No. PCT/CN2017/118079.

(Continued)

*Primary Examiner* — Hai V Nguyen
(74) *Attorney, Agent, or Firm* — Michael Best & Friedrich LLP

(57) ABSTRACT

An electronic communication device and method for crowd-based application synchronization. The device includes a display, a memory storing a first application, a transceiver, and an electronic processor. The electronic processor is configured to associate the electronic communication device with a first talk group, determine a first function in which the first application is configured to perform, and receive, via the transceiver, information regarding a number of members of the first talk group that are using an instance of a second application to perform the first function. The electronic processor is further configured to automatically present, based on the information, on the display, a running instance of the second application or a selection mechanism for the second application.

18 Claims, 2 Drawing Sheets

(51) Int. Cl.
*H04W 4/08* (2009.01)
*H04W 84/18* (2009.01)

(58) Field of Classification Search
USPC .................................................. 455/518, 521
See application file for complete search history.

(56) References Cited

U.S. PATENT DOCUMENTS

| | | | | |
|---|---|---|---|---|
| 7,639,634 B2* | 12/2009 | Shaffer | H04L 12/66 | 370/261 |
| 7,761,591 B2* | 7/2010 | Graham | G06Q 40/02 | 709/233 |
| 8,056,802 B2* | 11/2011 | Gressel | G07C 9/22 | 235/382 |
| 8,095,140 B2* | 1/2012 | Tang | H04M 3/42357 | 455/450 |
| 8,125,988 B1* | 2/2012 | Sullivan | H04L 49/351 | 370/389 |
| 8,261,979 B2* | 9/2012 | Gressel | G07C 9/22 | 235/382.5 |
| 8,333,321 B2* | 12/2012 | Gressel | G06Q 30/0601 | 235/382 |
| 8,429,287 B2* | 4/2013 | Sullivan | H04N 21/2668 | 709/231 |
| 8,442,506 B2* | 5/2013 | Peacock | H04M 7/006 | 455/416 |
| 8,494,458 B2* | 7/2013 | Tucker | H04W 4/10 | 455/90.2 |
| 8,495,142 B2* | 7/2013 | Shaffer | H04L 65/4007 | 709/204 |
| 8,634,799 B1* | 1/2014 | Economy | H04W 48/18 | 455/404.1 |
| 8,862,173 B2* | 10/2014 | Marocchi | H04W 4/18 | 455/519 |
| 9,020,469 B2* | 4/2015 | Sullivan | H04W 4/06 | 455/412.1 |
| 9,230,304 B2* | 1/2016 | Lee | G06T 5/40 | |
| 9,237,483 B2* | 1/2016 | Oprescu-Surcobe | H04W 28/16 | |
| 9,271,311 B1* | 2/2016 | Gurney | H04W 76/50 | |
| 9,275,137 B2* | 3/2016 | Sullivan | H04W 4/18 | |
| 9,288,276 B2* | 3/2016 | Adamczyk | H04L 67/24 | |
| 9,304,667 B2* | 4/2016 | Petitt, Jr. | H04L 65/60 | |
| 9,424,547 B2* | 8/2016 | Gazdzinski | G06K 7/10366 | |
| 9,531,504 B1* | 12/2016 | Shah | H04L 1/1825 | |
| 9,577,976 B2* | 2/2017 | Mathias | H04M 7/0057 | |
| 9,590,932 B2* | 3/2017 | Hwang | H04L 51/046 | |
| 9,705,840 B2* | 7/2017 | Pujare | H04L 51/04 | |
| 9,715,482 B1* | 7/2017 | Bjorkegren | G06F 3/013 | |
| 9,736,618 B1 | 8/2017 | Haney | | |
| 9,813,484 B2* | 11/2017 | Bekiares | H04L 67/10 | |
| 9,930,536 B2* | 3/2018 | Smith | H04W 4/90 | |
| 9,959,513 B2* | 5/2018 | Borodow | G06Q 10/063114 | |
| 9,998,895 B1* | 6/2018 | Schuler | H04W 4/02 | |
| 10,038,656 B2* | 7/2018 | Zheng | H04L 67/1097 | |
| 10,057,546 B2* | 8/2018 | Renkis | G06T 19/003 | |
| 10,070,274 B2* | 9/2018 | Pai | H04W 4/10 | |
| 10,178,219 B1* | 1/2019 | Blanco | G10L 25/78 | |
| 10,248,379 B2* | 4/2019 | Steinberg | G06Q 10/10 | |
| 10,251,128 B2* | 4/2019 | Nguyen | H04W 4/14 | |
| 10,313,529 B1* | 6/2019 | Lee | H04M 3/40 | |
| 10,321,278 B2* | 6/2019 | Proctor | H04W 12/02 | |
| 10,322,330 B2* | 6/2019 | Wanke | H04L 67/22 | |
| 10,349,230 B2* | 7/2019 | Bhalla | H04W 4/029 | |
| 10,354,169 B1* | 7/2019 | Law | G06K 9/209 | |
| 10,356,565 B2* | 7/2019 | Patel | H04W 28/16 | |
| 10,421,437 B1* | 9/2019 | Koskan | G08B 13/181 | |
| 10,425,776 B2* | 9/2019 | Bestor | G06Q 50/26 | |
| 10,447,842 B1* | 10/2019 | Veerasubramanian | H04W 4/10 | |
| 10,460,711 B2* | 10/2019 | Sullivan | G10H 1/366 | |
| 10,631,139 B2* | 4/2020 | Proctor | H04W 12/10 | |
| 10,645,127 B1* | 5/2020 | Potts | H04L 67/10 | |
| 10,653,934 B2* | 5/2020 | Wanke | A63F 13/798 | |
| 10,656,905 B2* | 5/2020 | Steinberg | G06Q 10/10 | |
| 10,673,942 B2* | 6/2020 | Illowsky | H04L 65/1083 | |
| 10,757,195 B2* | 8/2020 | Rojvongpaisal | H04L 67/141 | |
| 10,812,540 B2* | 10/2020 | Kaplita | H04L 65/1096 | |
| 10,824,615 B2* | 11/2020 | Proctor | G06Q 10/00 | |
| 10,916,258 B2* | 2/2021 | Barnett | G10L 21/18 | |
| 2003/0093187 A1* | 5/2003 | Walker | B64D 45/0034 | 701/1 |
| 2003/0233286 A1* | 12/2003 | Hahn-Carlson | G06Q 30/0283 | 705/317 |
| 2004/0010463 A1* | 1/2004 | Hahn-Carlson | G06Q 30/0601 | 705/39 |
| 2004/0028193 A1* | 2/2004 | Kim | H04M 3/42221 | 379/68 |
| 2007/0100981 A1* | 5/2007 | Adamczyk | H04L 69/18 | 709/223 |
| 2008/0091761 A1* | 4/2008 | Tsao | G06F 3/0482 | 709/201 |
| 2008/0162637 A1* | 7/2008 | Adamczyk | H04L 51/043 | 709/204 |
| 2008/0191009 A1* | 8/2008 | Gressel | H04W 4/021 | 235/382 |
| 2009/0045942 A1* | 2/2009 | Schurter | G08B 27/001 | 340/539.11 |
| 2009/0052442 A1* | 2/2009 | Chen | H04L 67/24 | 370/389 |
| 2010/0110956 A1* | 5/2010 | Hepworth | H04W 4/90 | 370/312 |
| 2011/0071880 A1* | 3/2011 | Spector | H04W 4/90 | 340/573.1 |
| 2012/0022902 A1* | 1/2012 | Gressel | H04L 63/108 | 705/5 |
| 2012/0165100 A1* | 6/2012 | Lalancette | A63F 13/44 | 463/42 |
| 2012/0236201 A1* | 9/2012 | Larsen | H04N 21/439 | 348/468 |
| 2012/0275391 A1* | 11/2012 | Cui | H04W 72/1247 | 370/329 |
| 2013/0172037 A1* | 7/2013 | Govind | H04W 8/186 | 455/518 |
| 2013/0263021 A1* | 10/2013 | Dunn | H04N 21/4532 | 715/756 |
| 2014/0133318 A1* | 5/2014 | Kuehner | H04W 4/023 | 370/252 |
| 2014/0310746 A1* | 10/2014 | Larsen | H04N 21/242 | 725/37 |
| 2014/0357234 A1* | 12/2014 | Sullivan | H04L 67/10 | 455/412.1 |
| 2014/0368601 A1* | 12/2014 | deCharms | H04L 67/26 | 348/14.02 |
| 2014/0369601 A1* | 12/2014 | Lee | G06T 5/001 | 382/167 |
| 2015/0019982 A1* | 1/2015 | Petitt, Jr. | G08B 5/36 | 715/738 |
| 2015/0149403 A1* | 5/2015 | Sullivan | H04W 4/06 | 707/603 |
| 2015/0286381 A1* | 10/2015 | Nguyen | G06F 9/451 | 715/752 |
| 2015/0288632 A1* | 10/2015 | Zheng | H04L 67/1097 | 709/206 |
| 2015/0296186 A1* | 10/2015 | Renkis | G08B 13/19656 | 348/159 |
| 2016/0021429 A1* | 1/2016 | Perry | H04N 21/235 | 725/93 |
| 2016/0027292 A1* | 1/2016 | Kerning | H04W 4/14 | 455/404.2 |
| 2016/0066163 A1* | 3/2016 | Agulnik | H04W 4/10 | 455/404.1 |
| 2016/0143075 A1* | 5/2016 | Tucker | H04M 15/8061 | 370/329 |
| 2016/0165413 A1* | 6/2016 | Bhalla | H04W 4/08 | 455/456.5 |
| 2016/0191607 A1* | 6/2016 | Bekiares | G06F 16/45 | 709/217 |
| 2016/0234828 A1* | 8/2016 | Smith | H04W 4/90 |

(56) References Cited

U.S. PATENT DOCUMENTS

| | | | |
|---|---|---|---|
| 2017/0024088 A1* | 1/2017 | La Pean | H04W 4/90 |
| 2017/0235848 A1* | 8/2017 | Van Dusen | G06F 30/20 |
| | | | 705/12 |
| 2017/0265045 A1* | 9/2017 | Igumnov | H04W 4/90 |
| 2018/0018949 A1* | 1/2018 | Sullivan | G10H 1/366 |
| 2018/0077648 A1* | 3/2018 | Nguyen | H04W 4/021 |
| 2018/0091640 A1* | 3/2018 | Fulton | H05B 47/19 |
| 2018/0152815 A1* | 5/2018 | Pai | H04W 4/08 |
| 2018/0160277 A1* | 6/2018 | Patel | H04W 4/10 |
| 2018/0160782 A1* | 6/2018 | Wong | F04D 29/005 |
| 2018/0324124 A1* | 11/2018 | Zheng | H04L 51/32 |
| 2018/0349678 A1* | 12/2018 | Koskan | G06F 16/00 |
| 2018/0350344 A1* | 12/2018 | Zaslow | H04M 3/493 |
| 2018/0357073 A1* | 12/2018 | Johnson | H04M 1/72403 |
| 2018/0375986 A1* | 12/2018 | Blanco | G10L 25/78 |
| 2019/0005978 A1* | 1/2019 | Barnett | G06F 3/165 |
| 2019/0012341 A1* | 1/2019 | Proctor | G06Q 10/00 |
| 2019/0034157 A1* | 1/2019 | Steinberg | G06Q 10/10 |
| 2019/0050238 A1* | 2/2019 | Lim | H04W 4/38 |
| 2019/0079650 A1* | 3/2019 | Tokuchi | G06F 3/0484 |
| 2019/0082304 A1* | 3/2019 | Bestor | H04M 3/493 |
| 2019/0082305 A1* | 3/2019 | Proctor | G06F 16/9535 |
| 2019/0099653 A1* | 4/2019 | Wanke | A63B 24/0062 |
| 2019/0174289 A1* | 6/2019 | Martin | H04L 67/18 |
| 2019/0179601 A1* | 6/2019 | Steinberg | G06Q 50/30 |
| 2019/0188328 A1* | 6/2019 | Oyenan | G06F 16/9038 |
| 2019/0197354 A1* | 6/2019 | Law | G06K 9/78 |
| 2019/0197369 A1* | 6/2019 | Law | G06K 9/0063 |
| 2019/0253847 A1* | 8/2019 | Proctor | H04L 63/105 |
| 2019/0374839 A1* | 12/2019 | Wanke | H04L 67/38 |
| 2019/0384794 A1* | 12/2019 | Holly, Jr. | G06F 16/90332 |
| 2020/0030681 A1* | 1/2020 | Wanke | A63F 13/87 |
| 2020/0125218 A1* | 4/2020 | Bender | H04L 12/4641 |
| 2020/0304547 A1* | 9/2020 | Lu | H04N 7/152 |
| 2020/0312290 A1* | 10/2020 | Sullivan | G10H 1/366 |
| 2020/0351341 A1* | 11/2020 | Illowsky | G06F 9/5072 |
| 2020/0387277 A1* | 12/2020 | Tokuchi | G06F 3/0484 |

OTHER PUBLICATIONS

Australian Patent Office Examination Report for Application No. 2017443348 dated Jun. 9, 2021 (4 pages).

European Patent Office Extended Search Report for Application No. 17935639.9 dated Apr. 9, 2021 (9 pages).

* cited by examiner

SYSTEM AND METHOD FOR CROWD-ORIENTED APPLICATION SYNCHRONIZATION

BACKGROUND OF THE INVENTION

Public safety personnel and other workers responding to incidents may use portable electronic devices to assist them during the performance of their duties. Some portable electronic devices, for example smart telephones and tablet computers, provide a suite of applications and features that interact with and consume data from computer systems. Workers use the applications and device features to facilitate communication and collaboration between one another and remote supervisors, dispatchers, and other personnel, for example, during incident response. The consistent presentation of such applications and features across devices and platforms improves ease of use and the efficacy of the incident response.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
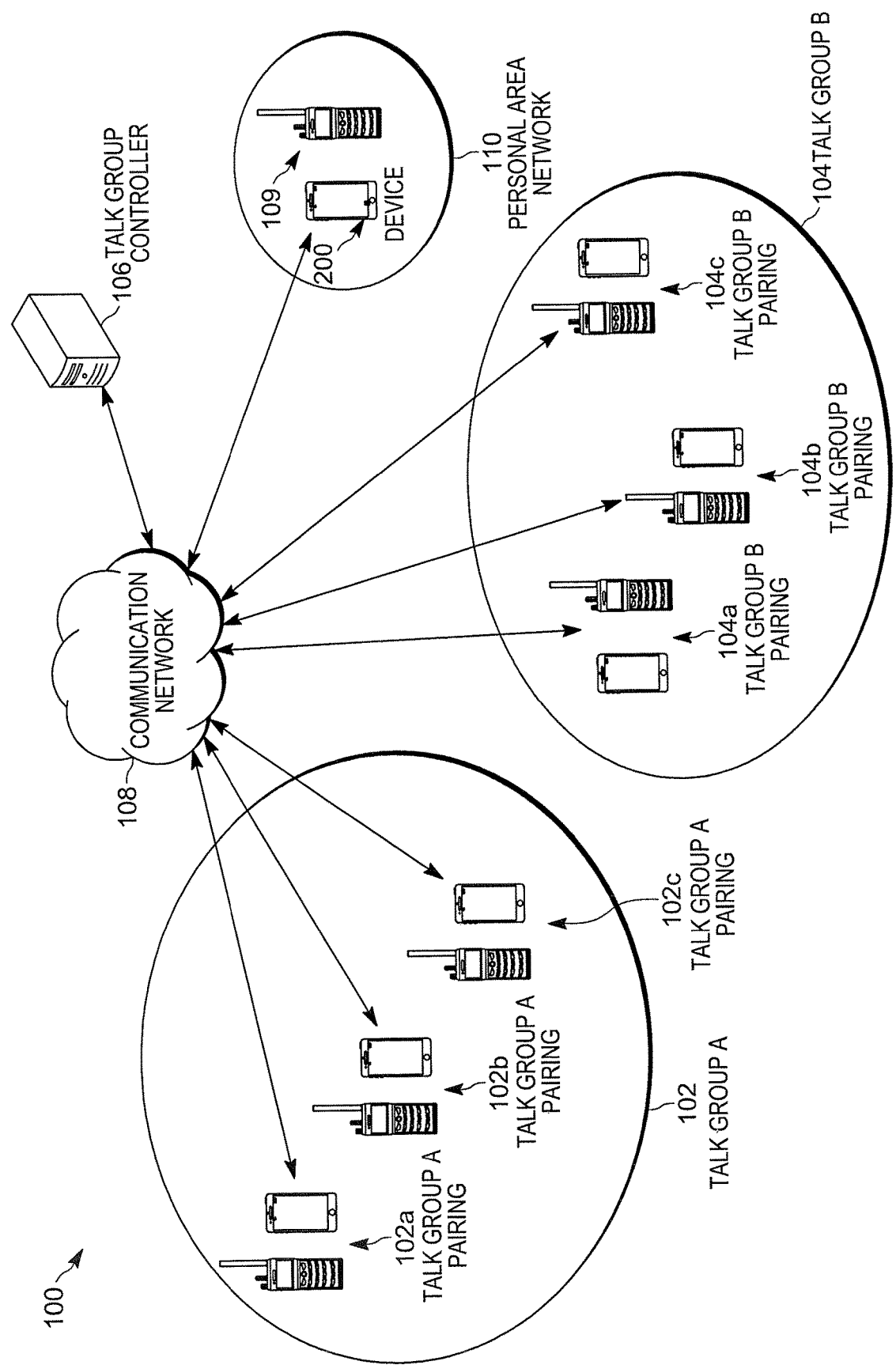
FIG. 1 is a communication system in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, public safety personnel use portable electronic devices to assist them with their work, including incident response. Professional devices are often designed for mission critical operations, presenting applications and features to the user in a consistent way according to organizational preferences. Such consistency increases user efficiency and reduces mistakes. However, consumer devices are configured by individual users to present applications and features to the user according to their preferences. As a result of information technology consumerization, many public safety personnel and other workers operate in bring your own device (BYOD) environments, where they are permitted to use personally owned consumer electronic devices in the workplace. Such devices are often used in conjunction with professional electronic devices.

Professional devices often use a single application for a single purpose across an organization, while users of consumer devices may use multiple applications for performing the same purpose. A consumer device may include applications for video calling, text messaging, social media posting, data sharing, e-mailing, document creation and editing, mapping and navigation, weather information, and the like. Consumer devices may also operate on varied hardware and software platforms, which present applications and features differently. In order to collaborate and communicate using consumer devices or a mix of consumer and professional devices, workers must agree on which applications will be used for which purposes, and when. Such agreement is not always possible prior to an incident response. For example, it may not be known ahead of time which personnel will respond to an incident, or what devices they are bringing with them. Once an incident response is underway, taking time to coordinate device usage can hinder the incident response. Thus, the blending of consumer and professional devices can lead to decreased performance, especially during incident response, where speed and accuracy are important to successful outcomes. Accordingly, systems and methods are presented herein for crowd-oriented application synchronization. In other words, embodiments presented herein describe a user interface facilitating collaboration that determines an application to use on an electronic communication device based on usage information of the application by individuals within a collective group/talk group.

One example embodiment provides an electronic communication device. The electronic communication device includes a display, a memory storing a first application, a transceiver, and an electronic processor. The electronic processor is configured to associate the electronic communication device with a first talk group, determine a first function in which the first application is configured to perform, and receive, via the transceiver, information regarding a number of members of the first talk group that are using an instance of a second application to perform the first function. The electronic processor is further configured to automatically present, based on the information, on the display, a running instance of the second application or a selection mechanism for the second application.

Another example embodiment provides a method for crowd-oriented application synchronization on an electronic communication device, the method includes associating the electronic communication device with a first talk group, determining a first function in which a first application stored in a memory of the electronic communication device is configured to perform, receiving, via a transceiver of the electronic communication device, information regarding a number of members of the first talk group that are using an instance of a second application to perform the first function, and automatically presenting, based on the information, on a display of the electronic communication device, a running instance of the second application or a selection mechanism for the second application.

For ease of description, some or all or the example systems presented herein are illustrated with a single example of each of its component parts. Some examples may not describe or illustrate all components of the systems. Other example embodiments may include more or fewer of each of the illustrated components, may combine some components, or may include additional or alternative components.

FIG. 1 is a diagram of a communication system 100 according to one exemplary embodiment. The communication system 100 includes an electronic communication device 200, a first talk group 102, a second talk group 104, and a talk group controller 106. Each talk group 102 and 104 include a plurality of talk group pairings 102a-102c and 104a-104c respectively. Each talk group pairing 102a-102c and 104a-104c includes a first and second electronic communication device paired to each other via a personal area network (PAN), for example, Bluetooth or Zigbee. In some embodiments, the first and second communication devices communicate over different channels. For example, the first electronic communication device may be a a smart phone, a tablet, or the like while the second electronic communication device is a portable radio. In some embodiments, the electronic communication device and the portable radio of one or more of the talk group pairings 102a-102c and 104a-104c may be a single integrated device. In the following description, when explaining how a single electronic communication device functions, a reference to electronic communication device 200 is used. It is not necessary, however, that the electronic communication devices of the talk groups 102 and 104 be identical. The electronic communication devices of the talk group pairings 102a-102c and 104a-104c are merely exemplary. In some embodiments, the communication system 100 may include more or fewer communication devices and talk groups than illustrated in FIG. 1.

The electronic communication device 200, the first talk group (talk group A) 102, a second talk group (talk group B) 104, and the talk group controller 106 communicate with each other over a communication network 108. The network 108 may be a wireless communication network. All or parts of the network 108 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 108 may also include future developed networks. In some embodiments, the network 108 may also include a combination of the networks mentioned previously herein. In some embodiments, the talk group pairings 102a-102c and 104a-104c may communicate directly with each other using a communication channel or connection that is outside of the network 108. For example, the talk group pairings 102a-102c and 104a-104c may communicate directly with each other when they are within a predetermined distance from each other.

The talk group controller 106 monitors the electronic communication devices within each talk group 102 and 104. In some embodiments, the talk group controller 106 is a server that is a computer maintained, for example, at a call center or public safety command center. In some embodiments, the talk group controller 106 controls communication between the talk group pairings 102a-102c and 104a-104c over the network 108 in accordance with talk group affiliation.

As used herein, a talk group is a virtual radio channel (a shared channel selected from a group of channels or available frequencies) used for communication between a plurality of communications devices, other devices, or a combination thereof. A talk group may be defined or assigned based on various criteria. For example, a talk group may be established for devices associated with a particular public safety organization or department, a particular incident, a particular member role or designation, or a combination thereof. For example, a talk group may relate to an organization of first responders, a group of police officers, a fire incident, or a combination thereof. Similarly, a talk group may relate to members having the same role or designation (for example, police officer, detective, supervisor, paramedic, firefighter, and the like). As another example, paramedics and firefighters might be grouped into two different talk groups even though they are responding to the same public safety incident.

It should be noted that although the talk group pairings 102a-102c and 104a-104c are illustrated and described herein and being members of only one talk group (talk groups 102 and 104 respectively), it should be understood that in some embodiments, one or more of the talk group pairings 102a-102c and 104a-104c are members of or are affiliated with more than one talk group. It should also be noted that throughout the following description, reference is made to the talk groups 102 and 104 and the talk group pairings 102a-102c and 104a-104c (including their first and second electronic communication devices) to provide examples of the methods and systems being explained. The talk groups 102 and 104 and their associated devices are merely exemplary and have been simplified for the sake of explanation. In some embodiments, the communication system 100 includes more or fewer communication devices and more or fewer talk groups. In some embodiments, the talk groups have more or fewer affiliated communication devices. In some embodiments, the talk groups do not have the same number of affiliated communication devices.

As illustrated in FIG. 1, the electronic communication device 200 (described in more detail below in regard to FIG. 2) may be a handheld communication device, for example, a mobile telephone or other portable communication device, smart watch or other smart wearable, or other device configured to communicate over the network 108. In some embodiments, the electronic communication device 200 may be paired to a portable/handheld radio 109 carried by a public safety officer or first responder, such as a police officer via a personal area network 110 (for example, via Bluetooth, Zigbee, and so on). In some embodiments, the electronic communication device 200 is a mobile communication device mounted in or on a vehicle (for example, a police vehicle). In some embodiments, the electronic communication device 200 may be a device maintained, for example, at a call center or public safety command center.

Figure 2:
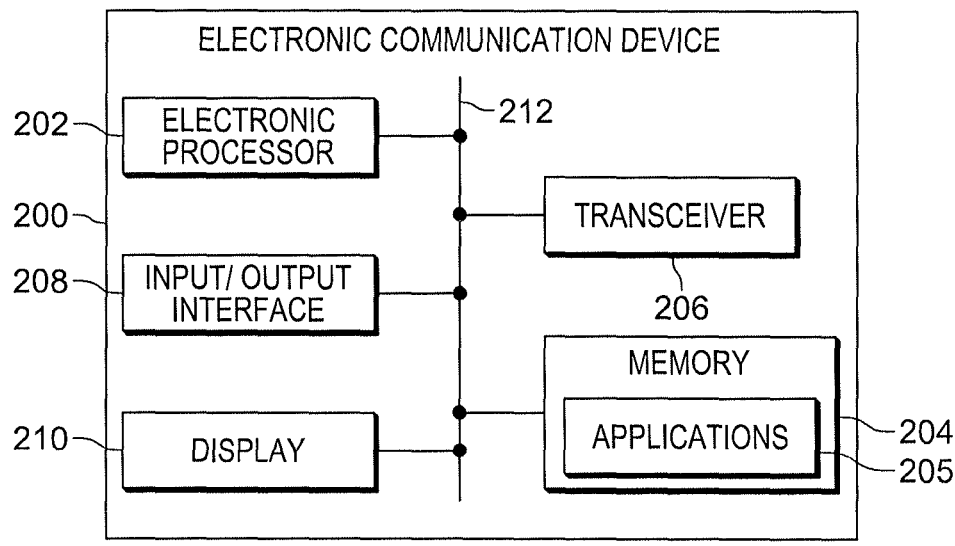
FIG. 2 is a block diagram of an electronic communication device of the communication system of FIG. 1 in accordance with some embodiments.

FIG. 2 is a block diagram of the electronic communication device 200 according to some embodiments. In the example illustrated, the electronic communication device 200 includes an electronic processor 202, a memory 204, a transceiver 206, an input/output (I/O) interface 208, and a display 210. The illustrated components, along with other various modules and components are coupled to each other by or through one or more control or data buses, for example a communication bus 212, that enable communication therebetween. The use of control and data buses for the interconnection between and exchange of information among the various modules and components would be apparent to a person skilled in the art in view of the description provided herein. The electronic communication device 200 is presented as an example that may be programmed and configured to carry out the functions described herein. It should be understood that, in other constructions, the electronic communication device 200 includes additional, fewer, or different components than those illustrated in FIG. 2. For example, in some embodiments, the electronic communication device 200 also includes a camera and a location component (for example, a global positioning system receiver). In some embodiments, the electronic communication device 200 performs additional functionality than the functionality described below.

The memory 204 can include one or more non-transitory computer-readable media, and includes a program storage area and a data storage area. The program storage area and the data storage area can include combinations of different types of memory, as described herein. The memory 204 may take the form of any non-transitory computer-readable medium. In the embodiment illustrated, the memory 204 stores, among other things, one or more applications 205. Each of the applications 205 are configured to perform a particular function and/or provide access to features of the device when executed by the electronic processor 202. Functions and features include, for example, texting, audio communications, retrieving and displaying information from a public and/or private database (i.e. weather, dispatch control, etc.), video/camera capture, and the like.

The transceiver 206 is configured for wireless coupling to wireless networks (for example, land mobile radio (LMR) networks, Long Term Evolution (LTE) networks, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the electronic communication device 200 may include a connector or port (not shown) for receiving a connection to a wired network (for example, Ethernet). The electronic processor 202 is configured to operate the transceiver 206 to receive input from and to provide system output, or a combination of both. The transceiver 206 obtains information and signals from, and provides information and signals to, (for example, over one or more wired and/or wireless connections) devices (including, in some embodiments, from the talk group controller 106) both internal and external to the electronic communication device 200.

The I/O interface 208 operates to receive input from, for example, a user of the electronic communication device 200, to provide system output, or a combination of both. The I/O interface 208 obtains information and signals from, and provides information and signals to, (for example, over one or more wired and/or wireless connections) devices both within and outside the electronic computing system. Input may be provided via, for example, a keypad, additional microphones, soft keys, icons, soft buttons, a scroll ball, buttons, and the like. System output may be provided via a visual and/or audio output (for example, the display 210). The display 210 may be a suitable display device such as, for example, a liquid crystal display (LCD) touch screen, or an organic light-emitting diode (OLED) touch screen. The I/O interface 208 may include a graphical user interface (GUI) (for example, generated by the electronic processor 202, from instructions and data stored in the memory 204, including GUIs corresponding to a particular application of the plurality of applications 205, or received from the talk group controller 106, and presented on the display 210) that enables a user to interact with the electronic communication device 200.

The electronic processor 202 obtains and provides information (for example, from the memory 204 and/or the transceiver 206), and processes the information by executing one or more software instructions or modules, capable of being stored, for example, in a random access memory ("RAM") area of the memory 204 or a read only memory ("ROM") of the memory 204 or another non-transitory computer readable medium (not shown). The software can include firmware, one or more applications, program data, filters, rules, one or more program modules, and other executable instructions. The electronic processor 202 is configured to retrieve from the memory 204 and execute, among other things, software related to the control processes and methods described herein.

Figure 3:
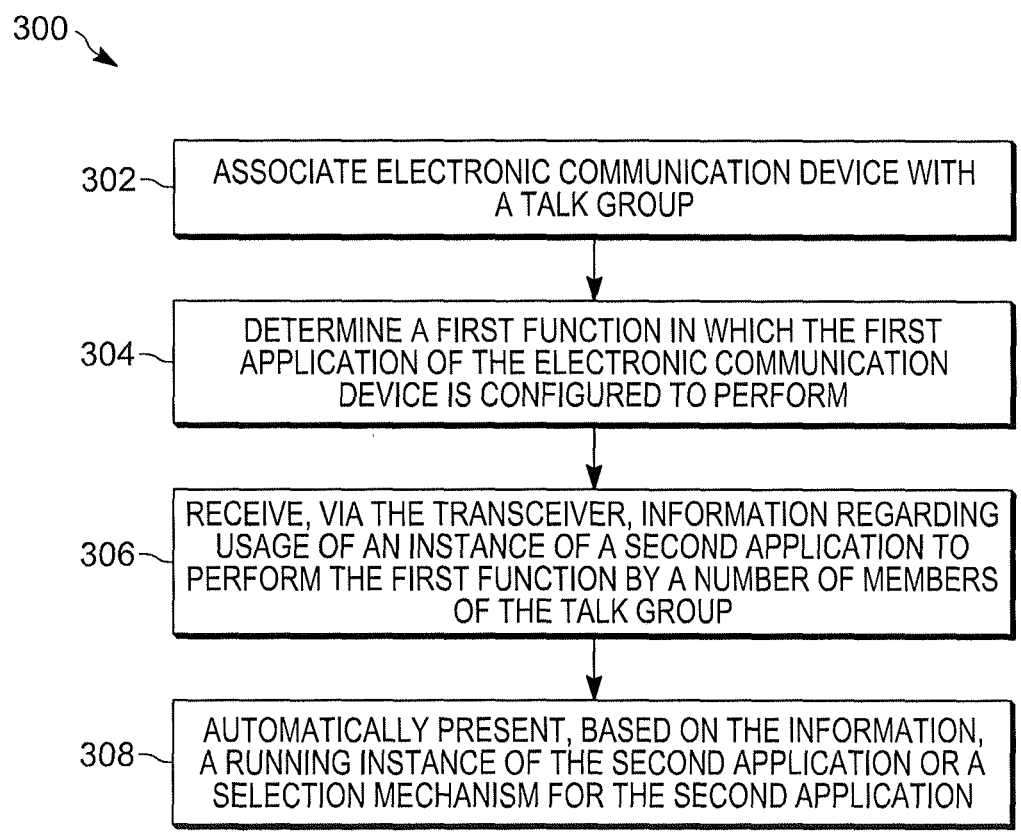
FIG. 3 is flowchart illustrating a method implemented by the electronic communication device of FIG. 2 in accordance with some embodiments.

FIG. 3 is a flowchart illustrating a method 300 of crowd-oriented application synchronization implemented by the electronic communication device 200 according to some embodiments. As an example, the method 300 is described as being performed by the electronic communication device 200 and, in particular, the electronic processor 202. However, it should be understood that in some embodiments, portions of the method 300 may be performed by other devices, including, for example, the talk group controller 106.

At block 302, the electronic processor 202 associates the electronic communication device 200 with a first talk group. For example, in regard to FIG. 1, the electronic processor determines when the electronic communication device 200 joins a talk group, for instance talk group A 102. In some embodiments, the electronic communication device 200 is in communication with a portable radio (for example, the portable radio 109 of FIG. 1) via a personal area network (for example the PAN of FIG. 1). In such embodiments, the electronic processor 202 may associate the electronic communication device 200 with the first talk group based on a determination that the portable radio 109 has joined the first talk group. In further embodiments, the electronic processor 202 is further configured to determine the electronic communication device 200 has joined a talk group based on a change in a scan list of the portable radio 109.

Returning to FIG. 3, at block 304, the electronic processor 202 determines a function in which the first application is configured to perform. For instance, when an instance of a first application is running or the electronic communication device 200 receives a user input requesting that an instance of the first application be executed, the electronic processor 202 determines what function (or functions) the application is used for.

At block 306, the electronic processor 202 receives information regarding usage of a second application to perform the first function by a number of members of the talk group. Specifically, information regarding what application (that is configured to perform the same, or a similar function as the first application on the electronic communication device 200) is presently stored and/or are currently being used by a number of the electronic communication devices that are affiliated with the talk group. In some embodiments, the electronic processor 202 requests the information by communicating with the electronic communication devices (part of the talk group pairings) associated with the talk group directly. In some embodiments, the information is received from the talk group controller 106 via the communication network 108. In some embodiments, the electronic communication device 200 receives the information directly from the electronic communication devices affiliated with the talk group the electronic communication device 200 is affiliated with.

It should be understood that, in some usage cases, more than one application that performs the same function as the first application of block 304 may be used among the electronic communication devices affiliated with the talk group. In such cases, in some embodiments, the second application is selected from a plurality of applications configured to perform the function based on a score. Specifically, each application (or instances thereof) detected among the electronic communication devices of the talk group are scored, and the application with the highest score is selected as the second application. In some embodiments, the score is based on a number of instances of or the number of electronic communication devices storing the particular application within the talk group. For example, the talk group pairings 102a and 102c may be using an application "A" to perform a function while the talk group pairing 102b may be using an application "B" to perform the same function. Since the application "A" is being used on the most devices in the talk group 102, the application "A" will have a higher score than the application "B". Thus, when the electronic processor 202 associates the electronic communication device 200 with the talk group 102, the electronic processor 202 receives information regarding application "A".

In some embodiments, at least one member of the talk group is assigned a weight (or multiplier) and the score of the application on/being used by an electronic communication device associated with the at least one member is adjusted based on the weight. The weight may be assigned based on an assigned role of the member. The assigned role may be, for example, the user's field role at the emergency scene. The field role may be based on the user's agency (for example, police, fire, military), and the user's assigned role within the agency or at the emergency scene (for example, perimeter security, fire suppression, support services, medical, supervisory, etc.). Another example is the user's current task or recently assigned tasks (for example, providing medical care to a particular person or area), and information about recently assigned tasks (both complete and incomplete). Another example is the user's current status including the user's deployment status (for example, on call or en route), the user's shift status (for example, just on duty, mid-shift, end of shift, off shift), and the user's group status (for example, part of a larger group or an individual deployment). For example, the score of an application used on an electronic communication device of a member of the talk group that is a commanding officer may be increased by a weight due to their assigned role. In some embodiments, the weights/multipliers may be assigned to an electronic communication device via a remote server (for example, the talk group controller 106 or a dispatch server). In some embodiments, the weights/multipliers may be assigned by one or more of the members (automatically or manually by a user) of the talk group.

At block 308, the electronic processor 202 presents on the display 210, based on the information received at block 306, a running instance of the second application or a selection mechanism for the second application. The selection mechanism may be a prompt for the user of the electronic communication device 200 to open the second application or to download and install the second application when the second application is not presently stored in a memory local to the electronic processor 202. The second application may be downloaded from a database within or outside of the communication system 100 of FIG. 1. In some embodiments, the talk group controller 106 may provide the second application to the electronic communication device 200. In some embodiments, the selection mechanism may be an icon associated with or a graphical view of the second application. The electronic processor 202 may then execute an instance of the second application in response to a user input applied to the selection mechanism of the second application. The running instance of the application is the execution of the second application on the electronic communication device 200.

In some embodiments, the electronic processor 202 determines that a second application configured to perform a second function (different from the first function) is executed on the electronic communication device. In such embodiments, the electronic processor 202 performs the method 300 in regard to the second application configured to perform the second function. Likewise, in some embodiments, the electronic processor 202 is further configured to associate the electronic communication device 200 with a second talk group (for example, talk group B 104 of FIG. 1). This may be when the electronic communication device 200 is currently affiliated with or joins a second talk group. In such embodiments, the electronic processor 202 performs the method 300 in regard to the second application configured to perform the second function. In some embodiments, and as mentioned previously, the electronic communication device 200 may join the second talk group while still being affiliated or a member of the first talk group. In further embodiments, the electronic communication device 200 may leave the first talk group after joining the second talk group.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic communication device for crowd-oriented application synchronization, the electronic communication device comprising:
   a display;
   a memory storing a first software application;
   a transceiver; and
   an electronic processor configured to
      associate the electronic communication device with a first talk group;
      determine a first function in which the first software application is configured to perform;
      transmit, to one or more members of the first talk group, a request for information regarding which software application that performs the first function is being used by a number of members of the first talk group;
      receive, via the transceiver, information regarding usage of a second software application configured to perform the first function by a number of members of the first talk group; and
      automatically present, based on the information, on the display, a running instance of the second software application or a selection mechanism for the second software application;
   wherein the second software application is a different software application program from the first software application.

2. The electronic communication device of claim 1, wherein the electronic processor is further configured to
   associate the electronic communication device with a second talk group;
   transmit, to one or more members of the second talk group, a request for information regarding which software application that performs the first function is being used by a number of members of the second talk group;
   receive, via the transceiver, secondary information regarding usage of a third software application configured to perform the first function by a number of members of the second talk group; and
   automatically present, based on the secondary information, on the display, a running instance of the third software application or a selection mechanism for the third application.

3. The electronic communication device of claim 1, wherein the memory stores a third software application configured to perform a second function and wherein electronic processor is further configured to
   determine when a running instance of the third software application is executed on the electronic communication device;
   transmit, to one or more members of the first talk group, a request for information regarding which software application that performs the second function is being used by a number of members of the first talk group;
   receive, via the transceiver, secondary information regarding usage of a fourth software application configured to perform the second function by a number of members in the first talk group; and
   automatically present, based on the secondary information, on the display, a running instance of the fourth software application or a selection mechanism for the fourth application.

4. The electronic communication device of claim 1, wherein the electronic communication device is in communication with a portable radio via a personal area network.

5. The electronic communication device of claim 4, wherein the electronic processor associates the electronic communication device with the first talk group based on a determination that the portable radio has joined the first talk group.

6. The electronic communication device of claim 5, wherein the electronic processor is further configured to determine a talk group that the portable radio has joined based on a change in a scan list of the portable radio.

7. The electronic communication device of claim 1, wherein the second software application is selected from a plurality of software applications configured to perform the first function, wherein each application of the plurality of software applications is assigned a score.

8. The electronic communication device of claim 7, wherein at least one of the members of the first talk group is assigned a weight and wherein the score associated with a software application of the plurality of software applications used by the at least one member is based on the weight.

9. The electronic communication device of claim 1, wherein the electronic processor is further configured to execute the second software application in response to a user input applied to the selection mechanism of the second software application.

10. A method for crowd-oriented application synchronization on an electronic communication device, the method comprising:
   associating the electronic communication device with a first talk group;
   determining a first function in which a first software application stored in a memory of the electronic communication device is configured to perform;
   transmitting via a transceiver, to one or more members of the first talk group, a request for information regarding which software application that performs the first function is being used by a number of members of the first talk group;
   receiving, via a transceiver of the electronic communication device, information regarding usage of a second software application configured to perform the first function by a number of members of the first talk group; and
   automatically presenting, based on the information, on a display of the electronic communication device, a running instance of the second software application or a selection mechanism for the second software application,
wherein the second application is a different software application program from the first application.

11. The method of claim 10 further comprising
   associating the electronic communication device with a second talk group;
   transmitting, to one or more members of the second talk group, a request for information regarding which software application that performs the first function is being used by a number of members of the second talk group;
   receiving, via the transceiver, secondary information regarding usage of a third software application configured to perform the first function by a number of members of the second talk group; and
   automatically presenting, based on the secondary information, on the display, a running instance of the third software application or a selection mechanism for the third software application.

12. The method of claim 10 further comprising
   determining when an instance of a third software application configured to perform a second function is executed on the electronic communication device;
   transmitting, to one or more members of the first talk group, a request for information regarding which software application that performs the second function is being used by a number of members of the first talk group;
   receiving, via the transceiver, secondary information regarding usage of a fourth software application configured to perform the second function by a number of members in the first talk group; and
   automatically presenting, based on the secondary information, on the display, a running instance of the fourth software application or a selection mechanism for the fourth software application.

13. The method of claim 10, wherein the electronic communication device is in communication with a portable radio via a personal area network.

14. The method of claim 13, wherein associating the electronic communication device with the first talk group is based on a determination that the portable radio has joined the first talk group.

15. The method of claim 13, wherein the method further includes determining a talk group that the portable radio has joined based on a change in a scan list of the portable radio.

16. The method of claim 10, wherein the second software application is selected from a plurality of software applications configured to perform the first function, wherein each software application of the plurality of software applications is assigned a score.

17. The method of claim 16, wherein at least one member of the first talk group is assigned a weight and wherein the score associated with a software application of the plurality of software applications used by the at least one member is based on the weight.

18. The method of claim 10, the method further comprising executing the second software application in response to a user input applied to the selection mechanism of the second software application.

\* \* \* \* \*